US009021083B2

(12) United States Patent
Little (10) Patent No.: US 9,021,083 B2
(45) Date of Patent: Apr. 28, 2015

(54) SERVICE ORIENTED ARCHITECTURE WITH DYNAMIC POLICY ENFORCEMENT POINTS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 471 days.

(21) Appl. No.: 12/324,776

(22) Filed: Nov. 26, 2008

(65) Prior Publication Data
US 2010/0146037 A1 Jun. 10, 2010

(51) Int. Cl.
*G06F 15/173* (2006.01)
*G06F 17/30* (2006.01)

(52) U.S. Cl.
CPC .............................. *G06F 17/30306* (2013.01)

(58) Field of Classification Search
USPC ................................... 709/203, 223, 224, 225
See application file for complete search history.

(56) References Cited

U.S. PATENT DOCUMENTS

| | | | |
|---|---|---|---|
| 7,080,078 B1 | 7/2006 | Slaughter et al. | |
| 7,159,224 B2 | 1/2007 | Sharma et al. | |
| 7,185,342 B1 | 2/2007 | Carrer et al. | |
| 7,310,684 B2 | 12/2007 | Patrick et al. | |
| 7,539,996 B2 | 5/2009 | Nomura et al. | |
| 2005/0270970 A1 | 12/2005 | Patrick et al. | |
| 2005/0273518 A1 | 12/2005 | Patrick et al. | |
| 2007/0097996 A1 | 5/2007 | Millefiorini et al. | |
| 2007/0263534 A1 | 11/2007 | Pavlick | |
| 2008/0250051 A1 | 10/2008 | Grechanik et al. | |
| 2008/0256544 A1 | 10/2008 | Eigler et al. | |
| 2008/0299947 A1 | 12/2008 | Little et al. | |
| 2009/0106428 A1 | 4/2009 | Dahlen | |
| 2009/0235325 A1* | 9/2009 | Dimitrakos et al. ............... 726/1 |
| 2010/0030890 A1* | 2/2010 | Dutta et al. .................... 709/224 |
| 2010/0049628 A1* | 2/2010 | Mannava et al. ................. 705/27 |
| 2010/0125618 A1* | 5/2010 | Dutta et al. .................... 707/822 |
| 2010/0138674 A1* | 6/2010 | Dimitrakos et al. ........... 713/194 |

OTHER PUBLICATIONS

Stuart Anderson et al., "Specification and Satisfaction of SLA's in Service Oriented Architectures", Feb. 15, 2005, 10 pages.
Erik King, "Perpetual Enterprise Management Service (PEMS) for Next Generation SOA-based Command & Control Systems", Mar. 28, 2005, 49 pages, Science Application International Corporation (SAIC), McLean, Virginia.
King, Erik, "Perpetual Enterprise Management Service (PEMS) for C2 SOA Deployments", Jun. 14, 2005, 23 pages.
Vasudevan, Venu, "A Web Services Primer," XML.com, Published on XML.com http://www.xml.com/pub/a/ws/2001/04/04/webservices/index.html, May 30, 2007, http://webservices.xml.com/lpt/a/760, pp. 1-10.
Mega, Giuliano, et al., "Debugging Distributed Object Applications With the Eclipse Platform," Department of Computer Science, University of Sao Paulo, Copyright 2004 By ACM, Inc. pp. 1-5.

(Continued)

*Primary Examiner* — Joon H Hwang
*Assistant Examiner* — Cheikh Ndiaye
(74) *Attorney, Agent, or Firm* — Lowenstein Sandler LLP (57) ABSTRACT

A repository receives a policy enforcement point. The repository is a component of a service oriented architecture. A repository manager identifies a service associated with a service level agreement that specifies the policy enforcement point. The policy enforcement point is transmitted to the service. The policy enforcement point is then installed on the service without interrupting the service.

13 Claims, 7 Drawing Sheets

(56) References Cited

OTHER PUBLICATIONS

Satyanarayanan, M., et al., "Transparent Logging as a Technique for Debugging Complex Distributed Systems," School of Computer Science, Carnegie Mellon University, Pittsburgh, PA 15213, Apr. 17, 1992, pp. 1-3.

Tarafdar, Ashis, et al., "Debugging in a Distributed World: Observation and Control," The University of Texas at Austin, Austin, TX, 78712-1188, pp. 1-6.

Mittal, Neeraj, et al., "Debugging Distributed World; Observation and Control, "The University of Texas at Austin, Austin, TX, 78712-1188, pp. 1-10.

"Overview of JBossESB," JBoss.org: community drive, http://labs.jboss.com/jbossesb/resources/Overview.html, May 30, 2007, 2 pages.

"JBossESB Requirements and Architecture, Version: 0.3," May 2, 2006, pp. 1-12.

Van Huizen, Gordon, "JMS: An Infrastructure for XML-based Business-to-Business Communication, Learn how the Java messaging Service can provide a flexible, reliable, and secure means of exchanging XML-based transactions," JavaWorld.com, Feb. 1, 2000, This story appeared on JavaWorld at http://www.javaworld.com/javaworld/jw-02-2000/jw-02-jmsxml.html, Mar. 14, 2007, pp. 1-13.

"Enterprise Integration patterns—Message Store," Enterprise Integration Patterns, http://www.enterpriseintegrationpatterns.com/MessageStore.html, pp. 1-2.

"Service Component Architecture," IBM, http://www-128.ibm.com/developerworks/library/specification/ws-sca, Mar. 13, 2007, pp. 1-3.

Hunt, John, "The Holy Grail of Services: SCA," Reg Developer>>Code>>Java/J2EE, Original URL: http://www.regdeveloper.co.uk/2007/03/13/sca_for_soa/, http://www.regdeveloper.co.uk/2007/03/13/sca_for_soa/print.html, Mar. 14, 2007, pp. 1-6.

"Web Services Context Specification (WS-Context)," OASIS, Committee draft version 0.8, Version created Nov. 3, 2004, Editors, Mark Little, et al., Copyright © 2004 The Organization for the Advancement of Structured Information Standards [Appendix A], pp. 1-23.

"Web Service Endpoint Identification and Resolution: Use Cases and Requirements," Version 1.0, GWD-I (draft-ggf-wse-id-usecases-1.0-3), Open Grid Services Architecture Working Group, Editors: F. Siebenlist, ANL, et al., Apr. 21, 2006, ogsa-wg@ggf.org, pp. 1-16.

"Why ESB and SOA?" Version 0.3, Date: Jan. 27, 2006, pp. 1-7.

"Enterprise Service Bus" From Wikipedia, http://en.wikipedia.org/wiki/Enterprise_service_bus, May 30, 2007, pp. 1-4.

"Service-Oriented Architecture", from Wikipedia, http://en.wikipedia.org/wiki/Service_oriented_architecture, May 30, 2007, pp. 1-12.

Office Action for U.S. Appl. No. 11/809,896, mailed Jul. 23, 2009.
Office Action for U.S. Appl. No. 11/809,896, mailed Jan. 14, 2010.
Office Action for U.S. Appl. No. 11/809,896, mailed Oct. 25, 2010.
Office Action for U.S. Appl. No. 11/809,896, mailed Mar. 1, 2011.
Office Action for U.S. Appl. No. 11/809,896, mailed May 17, 2013.
Uspto; Office Action for U.S. Appl. No. 11/809,896, mailed Oct. 8, 2013.
Office Action for U.S. Appl. No. 11/809,896 mailed Oct. 8, 2013 (13 pages).
Office Action for U.S. Appl. No. 11/809,896, mailed Aug. 13, 2014.
Neeraj Mittal et al., "Debugging Distributed Programs Using Controlled Re-execution," The University of Texas at Austin, 10 pages.

* cited by examiner

SERVICE ORIENTED ARCHITECTURE WITH DYNAMIC POLICY ENFORCEMENT POINTS

TECHNICAL FIELD

Embodiments of the present invention relate to service oriented architectures, and more specifically to a service oriented architecture having a governance infrastructure that includes dynamic policy enforcement points.

BACKGROUND

Services in conventional distributed computing environments typically include service level agreements (SLAs). A service level agreement (SLA) is an agreement between a provider of a service and clients of the service that defines quality of service (QoS) guarantees and obligations of both the clients and of the service. The QoS guarantees, the service obligations and the client obligations are fulfilled by policy enforcement points (PEPs) that can be installed at the service and at the client. A policy enforcement point (PEP) is a logical entity that enforces policies specified in a SLA. In a conventional distributed computing environment, the service level agreement (SLA) and the PEPs associated with the SLA are hard coded into the service. The SLA and associated PEPs for a service are thus installed at the time that the service is deployed. To change the SLA and/or any of the PEPs in such conventional distributed computing systems, the service must be shut down, the SLA and/or PEPs must be rewritten, and the service must be redeployed. Therefore, any change to an SLA or to a PEP causes an interruption in service.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for updating policy enforcement points in a distributed computing system. In one embodiment, a repository receives a policy enforcement point. A repository manager identifies a service associated with a service level agreement that specifies the policy enforcement point. The repository manager transmits the policy enforcement point to the service. The policy enforcement point may be transmitted to the service in response to the service polling the repository for new and/or updated policy enforcement points and/or the policy enforcement point may automatically be sent to the service upon the policy enforcement point being added to the repository. The policy enforcement point is then installed on the service without interrupting the service. The policy enforcement point may also be transmitted to a client associated with the service level agreement.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "propagating", "identifying", "receiving", "polling", "configuring" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of transmitted signals (e.g., carrier waves, infrared signals, digital signals, etc.)), etc.

Figure 1A:
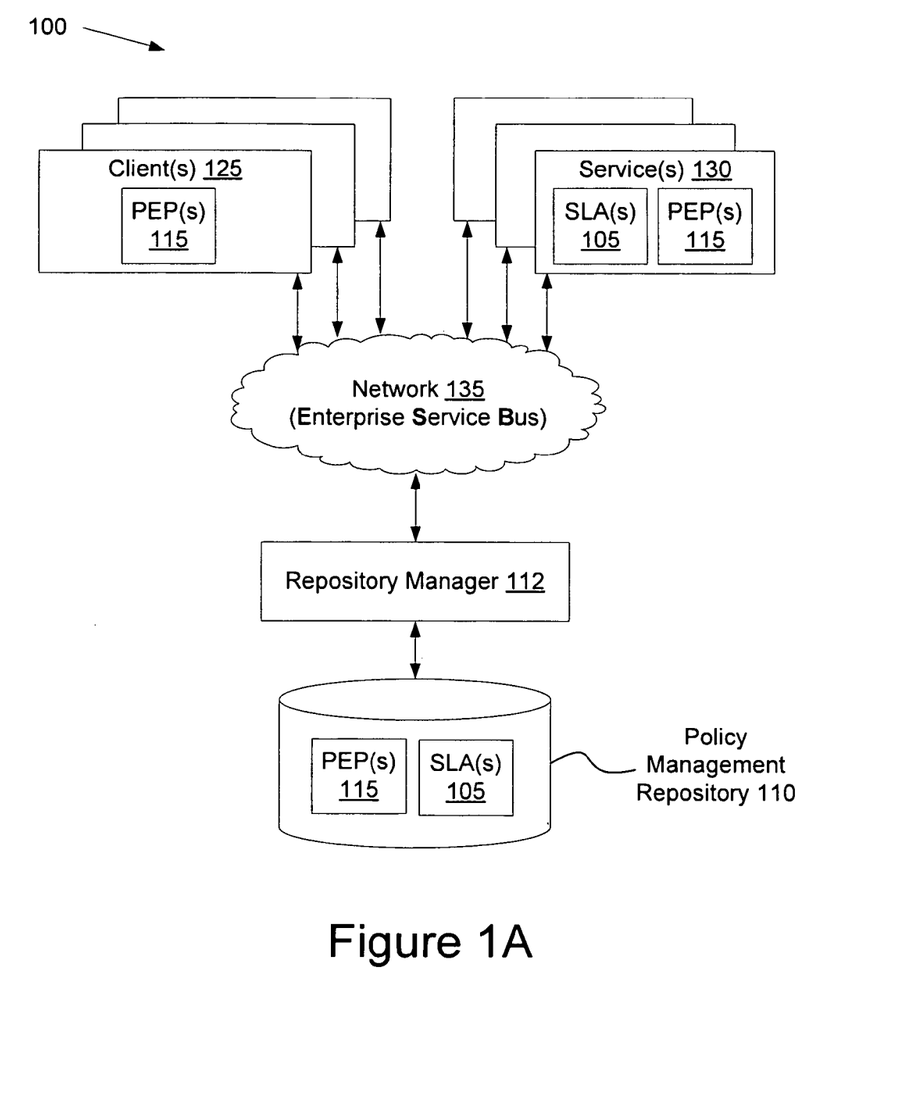
FIG. 1A illustrates an exemplary distributed computing system, in which embodiments of the present invention may operate.

FIG. 1A illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 may include clients 125, services 130, a repository manger 112 and a policy management repository 110 connected via a network 135. Each of the clients 125, services 130 and repository manager 112 may be both message producers and message consumers, as described below.

The network 135 may be a public network (e.g., Internet), a private network (e.g., Ethernet or a local area Network (LAN)), or a combination thereof. In one embodiment, the network 135 includes an enterprise service bus (ESB). An ESB is an event-driven and standards-based messaging engine that provides services for more complex architectures. The ESB provides an infrastructure that links together services 130 and clients 125 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Clients 125 may be, for example, personal computers (PC), palm-sized computing devices, personal digital assistants (PDA), etc. Clients 125 may also be applications run on a PC, server, etc. In the SOA, clients 125 include applications that access services 130. Clients 125 may be fat clients (clients that perform local processing and data storage), thin clients (clients that perform minimal or no local processing and minimal to no data storage), and/or hybrid clients (clients that perform local processing but little to no data storage).

Services 130 may be discretely defined sets of contiguous and autonomous functionality (e.g., business functionality, technical functionality, etc.). Services 130 may be resident on personal computers (PC), servers, routers, etc. Each service 130 may represent a process, activity or other resource that can be accessed and used by other services or clients on network 135. Each of the services 130 may be independent of other services 130, and may be accessed without knowledge of its underlying platform implementation.

In an example for a business function of "managing orders," services 130 may include create order, fulfill order, ship order, invoice order, cancel/update order, etc. Each such service may be autonomous from the other services 130 that are used to manage orders, and may be remote from one another and have different platform implementations. However, the services 130 may be combined and used by one or more applications to manage orders.

Services 130 include service level agreements (SLAs) 105. Each service level agreement (SLA) 105 specifies an agreement between a provider of a service 130 and clients 125 of the service 130 that defines quality of service (QoS) guarantees and obligations of both the clients 125 and of the service 130. QoS guarantees include measurable properties relating to non-functional aspects of the service, such as availability, performance and reliability. Examples of QoS guarantees include guaranteed up time (e.g., guaranteed percentage of time available vs. time unavailable), guaranteed response time (e.g., guarantee that messages will be responded to within 5 ms 95% of the time), guaranteed number of messages per hour, and so on. Examples of service obligations include security obligations, transactional obligations, reporting obligations, logging obligations, etc. Likewise, client obligations may include, for example, security obligations and transactional obligations. An SLA 105 may also include a validity period, a list of clients to which it applies, a scope of the services to be provided (e.g., service operations covered in the SLA), penalties to apply if the QoS guarantees and/or obligations are not satisfied, and/or other parameters.

A service 130 may include multiple different SLAs 105, each being associated with a different client 125 or collection of clients. A service 130 may also include multiple SLAs 105 that are associated with the same client 125 or set of clients, but that apply to different service operations. For example, if a client 125 attempts to perform a first service operation, a first SLA may apply, and if the same client 125 attempts to perform a second service operation, a second SLA may apply. Alternatively, a service 130 may include only one SLA that applies to all clients 125 and to all service operations.

Each SLA 105 specifies one or more enforcement policies (including the QoS guarantees, service obligations and client obligations) that must be satisfied in order to send messages to and/or receive messages from the service 130 having the SLA 105. These enforcement policies are fulfilled by policy enforcement points (PEPs) 115 that can be installed at the service 130 and/or at the client 125. Alternatively, PEPs 115 may be installed at a central server (not illustrated) through which all messages in the distributed computing system 100 flow. In one embodiment, each policy enforcement point (PEP) 115 enforces a single policy specified in a SLA 105. Alternatively, a single policy enforcement point (PEP) 115 may enforce multiple policies specified in an SLA 105. In one embodiment, clients 125 include client PEPs and services include service PEPs. Some PEPs 115 may be both client PEPs and service PEPs.

PEPs 115 may be configured to perform an operation on all messages that they receive. Alternatively, PEPs 115 may examine each received message and determine whether or not to operate on it based on, for example, a rules engine and accompanying rules. A PEP 115 enforces one or more policies by processing received messages to determine if they meet a rule or rules specified by the policies. PEPs 115 may determine whether a message meets one or more rules by examining the contents of the message, and may determine what action to take based on identified contents. For example, a PEP 115 may be configured only to accept messages having a specific time stamp, or including specific information. If the rules are not met, then the PEP 115 may ignore the message, or may send a fault (e.g., an error message) back to the sender of the message. For example, if a PEP 115 includes a rule that requires that messages be transactional, then non-transactional message may be ignored or bounced back to the sender.

In one embodiment, some or all policy enforcement points (PEPs) 115 are implemented as dispatchers. A dispatcher is a service that receives a message as an input, and outputs the message. Some dispatchers augment the message before it is output. Other dispatchers may leave a message unchanged, rewrite a message, reformat a message, and so on. Examples of PEPs 115 that can be implemented as dispatchers include security PEPs that add and remove security information to messages, transaction PEPs that add and remove transaction information to messages, encryption PEPs that encrypt and decrypt messages, etc. One example of a PEP 115 that leaves a message unchanged is a logging PEP that outputs a log each time a message is output.

The distributed computing system 100 includes a policy management repository 110 that may be a relational database, searchable filesystem, or other data storage arrangement. Policy management repository 110 includes a collection of policy enforcement points (PEPs) 115 that are specified in service level agreements (SLAs) 105 used by services 130 in distributed computing system 100. In one embodiment, the policy management repository 110 also includes the SLAs 105 that are associated with each of the stored PEPs 115.

In one embodiment, policy management repository 110 is controlled by repository manager 112. Repository manager 112 is a server that is connected to the policy management repository 110 and to network 135. Repository manager 112 may search policy management repository 110 in response to receiving queries from clients and/or services. Repository manger 112 may perform actions such as sending messages, receiving and acting on messages, etc. In one embodiment, repository manager 112 sends PEPs and/or SLAs to services and clients as the PEPs and SLAs are needed.

In one embodiment, when a new PEP is added to the policy management repository 110 and/or an existing PEP is updated/modified, the repository manager 112 determines which services 130 have SLAs 105 that specify the PEP. The repository manager 112 may then retrieve the new or updated PEP and transmit it to the appropriate services 130. Alternatively, services 130 periodically poll the policy management repository 110 and/or the repository manager 112 to determine whether any PEPs associated with SLAs used by the services 130 have been added and/or updated. In one embodiment, services 130 poll the repository manager 112 when an SLA used by the services 130 are modified.

Upon receiving a new or updated PEP, the service 130 may install the new or updated PEP without interrupting the service (e.g., without powering down the service, modifying code of the service, redeploying the service, etc.). In one embodiment, PEPs 115 are addressable, and updates for PEPs 115 are transmitted directly to the PEPs 115. Upon receiving an update, a PEP 115 may install the update without interrupting operation of the PEP 115.

In one embodiment, when an SLA in the policy management repository 110 is modified and/or a new SLA is added to the policy management repository 110, the repository manager 112 determines which services 130 use the modified SLA, and transmits the modified SLA to those services. The repository manager 112 may also transmit any PEPs associated with the modified or new SLA to the service 130. Alternatively, the repository manager 112 may transmit updated and new SLAs (and associated PEPs) to services upon being polled by those services 130. Upon receiving a new or updated SLA, a service 130 may install the new or updated SLA without interrupting the service.

In one embodiment, the policy management repository 110 is also a service repository that lists all services 130 in the distributed computing system 100. In such an embodiment, the policy management repository 110 may also include information about the services 130, such as their business application (e.g., bank, travel agency, etc.), where they are located, how to get messages to them (e.g., using JMS or HTTP), and all additional data necessary to communicate with those services 130. When a new service is added to the distributed computing system 100, an entry for the new service can be added to the policy management repository 110 along with any associated SLAs and/or PEPs.

In one embodiment, the policy management repository 110, repository manager 112 and PEPs 115 are part of a SOA governance infrastructure. The SOA governance infrastructure monitors services in the distributed computing system 100 and makes sure that they conform to their contractual obligations (e.g., as specified in the SLAs). In one embodiment, if the SOA governance infrastructure detects that a service is not meeting its contractual obligations, it takes corrective action such as causing the policy management repository to send updates of PEPs or new PEPs to the service.

Figure 1B:
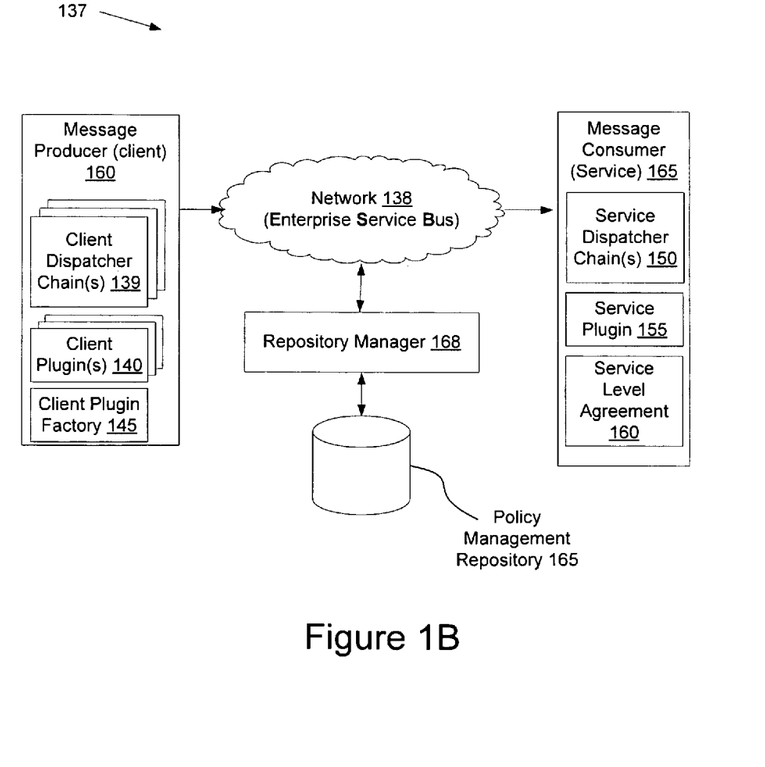
FIG. 1B illustrates another exemplary distributed computing system, in which embodiments of the present invention may operate.

FIG. 1B illustrates another exemplary distributed computing system 137, in which embodiments of the present invention may operate. In one embodiment, the distributed computing system 137 includes a message producer 160, a message consumer 165, a policy management repository 165 and a repository manager 168 connected via a network 138, which may be a public network (e.g., Internet), a private network (e.g., Ethernet or a local area Network (LAN)), or a combination thereof. In one embodiment, the network 138 includes an enterprise service bus (ESB) and a SOA governance infrastructure (not illustrated).

In the illustrated embodiment, the message producer 160 is a client, and includes one or more client dispatcher chains 139, one or more client plugins 140 and a client plugin factory 145. Alternatively, the message producer 160 may be a service. If the message producer 160 is a service, it may include a service dispatcher chain 150 and a service plugin 155, which are described below.

A message producer 160 is a client or service that generates a message. Messages include data that may cause an action to be performed by (e.g., initiate an event on), or convey information to, a message consumer (e.g., a service or client). A message may be generated for any of a myriad of purposes. For example, the message may be generated to report a purchase of a good, to request contact information, to begin a remote process (e.g., initiate a service), etc.

The message may include a message header having a unique message identifier and routing information (e.g., recipient, sender, message priority, etc.) to identify the message, and to route the message to end points (recipients) intended by the message producer and/or as determined by the ESB (e.g., by a router within the ESB). The message may be directed to a specific endpoint (e.g., a specific client or service), or the message may be posted to an intermediate location, which one or more endpoints may communicate with to receive the message. The message may also include a message context (e.g., custom fields or filters, transactional information, security information, etc.) and a message body. The message body may be formatted using an extensible markup language (XML), a standard generalized markup language (SGML), or other flexible format.

The client dispatcher chains 139 are hierarchical arrangements of dispatchers that include PEPs and/or other dispatchers. In one embodiment, a separate client dispatcher chain 139 is used to communicate with each service. Alternatively, a client dispatcher chain 139 may be used for sending messages to and receiving messages from multiple different services. For example, if two services have the same service level agreement, a single client dispatcher chain 139 may operate on messages directed to both services.

In one embodiment, each client dispatcher chain 139 includes its own policy enforcement points (PEPs). Therefore, if two different client dispatcher chains 139 include the same PEP, there are two copies of that PEP. In another embodiment, individual PEPs are shared between at least some client dispatcher chains 139. Some client dispatcher chains 139 may include pointers to necessary PEPs rather than including the actual PEPs. The pointers may point to PEPs in other client dispatcher chains 139, or to PEPs in a hierarchical tree structure that includes all PEPs or a subset of all PEPs.

PEPs and other dispatchers in a client dispatcher chain 139 are arranged in a predetermined order. The order of arrangement determines the order in which incoming messages and outgoing messages are processed. Incoming messages are generally processed in the opposite order of outgoing messages by the PEPs and other dispatchers in a client dispatcher chain 139.

Client plugins 140 operate as interfaces between the client and a message transporting means (e.g., the ESB). For example, a client plugin may pass messages from the client to an ESB, and from the ESB to the client. Each of the client plugins 140 receives messages from the client that are directed to a specific service or services, and sends messages to the client that originated from the specific service or services. In one embodiment, each client plugin 140 is associated with a single service. Alternatively, a single client plugin may be associated with multiple services.

Each of the client plugins 140 is associated with one of the client dispatcher chains 139. Once a client plugin 140 receives a message from the client, it directs the message to a first dispatcher (e.g., first PEP) in the client dispatcher chain with which it is associated. The client plugin 140 also receives messages that have been output by the client dispatcher chain 139 and passes them on to the client.

Before a client attempts to communicate with a service for the first time, the client must first determine how to communicate with the service, and what client obligations are associated with a SLA used by the service. Some services may require, for example, that messages be produced in distinct formats, and may require information such as transactional information, security information, etc. to be included in the message. Other services, for example, may not require security information or transactional information, but may require that all messages be encrypted.

In one embodiment, the message producer 160 includes a default client plugin and a default client dispatcher chain 139 that may be used when communicating with a service for which the client does not include a specified client dispatcher chain and client plugin. If the default client plugin and default client dispatcher chain are unsuccessful in communicating with the service, the client plugin factory 145 may be initiated. In another embodiment, there is no default client plugin or default client dispatcher chain.

The client plugin factory 145 determines how to communicate with a service, and generates client plugins 140 and client dispatcher chains 139 to enable such communication. In one embodiment, to generate a necessary client plugin and client dispatcher chain, the client plugin factory 145 queries repository manager 168. Repository manager 168 searches policy management repository 165 for all information necessary to communicate with the requested service, including any PEPs that the client will need to install, and transmits such information to the client plugin factory 145. In another embodiment, the client plugin factory 145 queries the service for such information (e.g., using a handshake protocol). The service may respond with all information necessary to communicate with the service. This information may include, for example, a list of necessary client PEPs, as well as what order the client PEPs need to be arranged in to produce a client dispatcher chain.

Each of the client plugins 140, the client plugin factory 145 and the dispatchers and PEPs in the client dispatcher chains 139 may be a service of an ESB. As services of the ESB, messages may be addressed to the dispatchers, PEPs, client plugins 140 and client plugin factory 145. A message addressed to one of these services may cause the service to reconfigure itself. Thereby, the same infrastructure and/or communication protocol that is used to send messages between clients and services may be used to reconfigure services of the ESB such as dispatchers, client plugins, etc. Alternatively, messages including SLAs and PEPs may be sent to active (currently installed and operational) PEPs and/or services using a different infrastructure and/or communication protocol than used for sending messages between clients and services. For example, the atom publishing protocol (AtomPub) and/or the extensible messaging and presence protocol (XMPP) may be used for distributing PEPs and SLAs.

In the illustrated embodiment, the message consumer 165 is a service, and includes a service dispatcher chain 150 and a service plugin 155. Alternatively, the message consumer 165 may be a client. If the message consumer is a client, it may include one or more client dispatcher chains 139, one or more client plugins 140 and a client plugin factory 145.

Message consumer 165 receives a message generated by message producer 160. Based on the content of the message, the message consumer may store information contained in the message, generate a response message to send to a service or client, undergo a state change, and/or initiate some other event. A state change initiated by a message may be dependent on contents of the message (e.g., the message body, message context, etc.), rules governing responses to the message, etc.

The service dispatcher chain 150 is a hierarchy of dispatchers at the service that is equivalent to the client dispatcher chains 139 described above. The service plugin 155 is equivalent to the client plugins 140, and couples a service to the distributed computing system 137 (e.g., to the ESB). In contrast to clients, a service may include only a single service dispatcher chain 150 and a single service plugin 155, regardless of how many clients it communicates with. In one embodiment, however, multiple service dispatcher chains and service plugins may be included in a service. Such additional service dispatcher chains and service plugins may be used, for example, to send, process, receive etc. messages according to different service level agreements.

Figure 2:
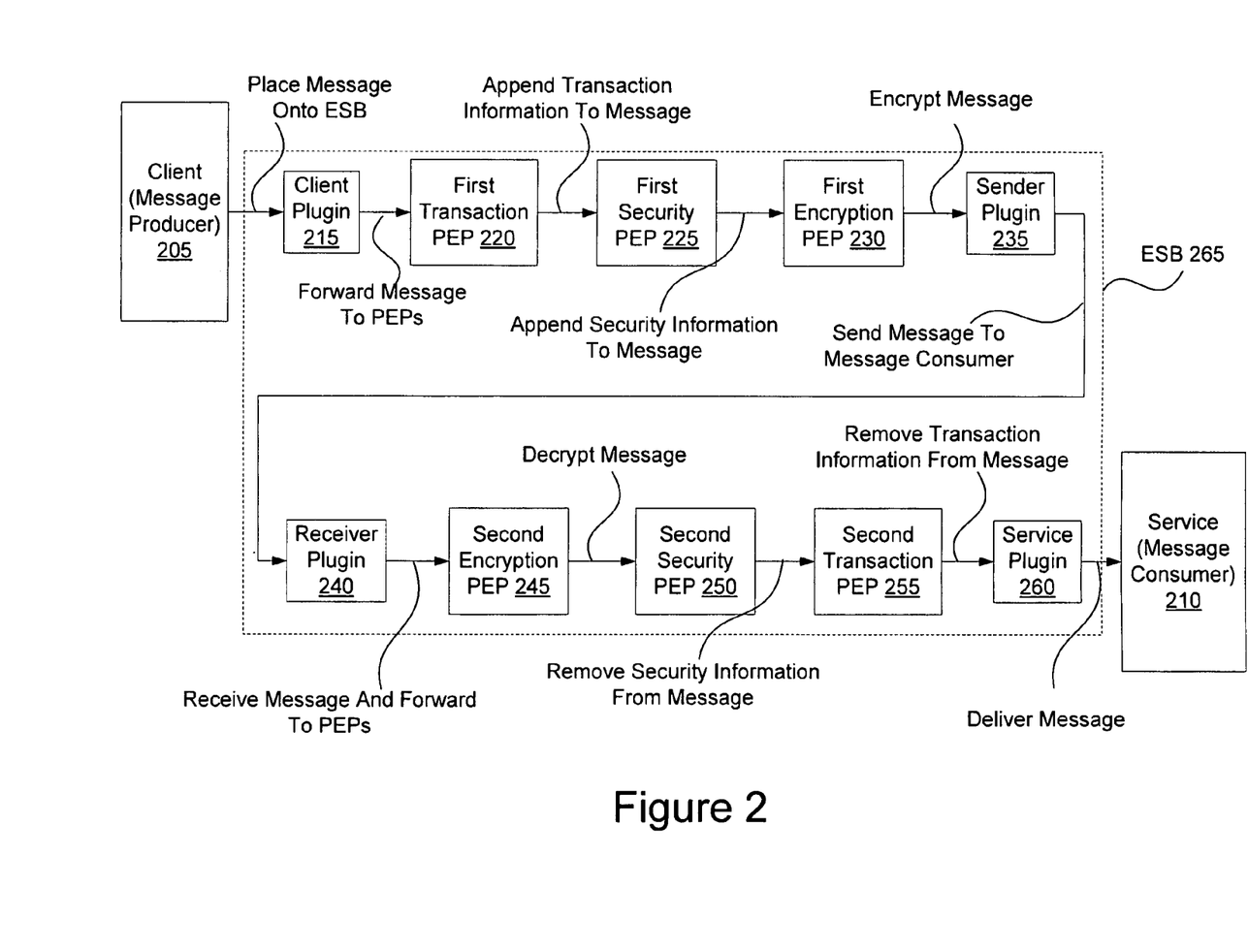
FIG. 2 is a data flow diagram illustrating a message flowing through an ESB, in accordance with one embodiment of the present invention.

FIG. 2 is a data flow diagram illustrating a message flowing through an ESB, in accordance with one embodiment of the present invention. The message originates at a client 205, which in the illustrated embodiment is a message producer, and is addressed to a service 210, which in the illustrated embodiment is a message consumer. Alternatively, the message may be addressed to any of the PEPs or plugins shown in FIG. 2.

Client 205 generates a message body, and places the message body onto the ESB 265 by sending the message body to client plugin 215. The client plugin 215 operates as an interface between the client 205 and the ESB 265. If the message had been addressed to a service other than service 210, the message might have been placed onto the ESB 265 by sending it to a different client plugin. Client plugin 215 adds a header and context to the message body to create a full message, and forwards the message to first transaction PEP 220.

First transaction PEP 220 appends transaction information to the message, and sends the message to first security PEP 225. First security PEP 225 appends security information to the message, and sends the message to first encryption PEP 230. First encryption PEP 230 encrypts the message and sends it to sender plugin 325. Sender plugin 325 is a dispatcher that directs the message to the service 210.

In one embodiment, each of client plugin 215, first transaction PEP 220, first security PEP 225, first encryption PEP 230 and sender plugin 235 are collocated with client 205. Thereby, these PEPs and plugins may occupy the same address space (e.g., share the same java virtual machine) as the client 205 for maximum efficiency and minimum overhead. Though the PEPs and plugins may occupy the same address space as client 205, each is a separate addressable service. In another embodiment, one or more of the PEPs and plugins may be external to client 205.

Receiver plugin 240 is a dispatcher that receives the message directed to service 210, and passes on the message to second encryption PEP 245. Second encryption PEP 245 decrypts the message and sends the message to second security PEP 250. Second security PEP 250 removes security information from the message and sends the message to second transaction PEP 255. Second transaction PEP 255 removes transaction information from the message and sends the message to service plugin 260. Service plugin 260 removes the context and header from the message, and delivers the message body to service 210, thereby removing the message from the ESB 265. Service 210 may then take appropriate action based on the message body.

If the second encryption PEP 245 were to receive an unencrypted message, the second encryption PEP would either return a fault to client 205 or ignore the message. Likewise, if the rules included in the second security PEP 250 or second transaction PEP 255 were not satisfied, the message would be ignored or a fault would be returned to client 205.

In one embodiment, each of service plugin 260, second transaction PEP 255, second security PEP 250, second encryption PEP 245 and receiver plugin 240 are collocated with service 210. Thereby, these PEPs and plugins may occupy the same address space as the service 210 for maximum efficiency and minimum overhead. Though the PEPs and plugins may occupy the same address space as service 210, each is a separate addressable service. In another embodiment, one or more of the PEPs and plugins may be external to service 210.

In the illustrated embodiment of FIG. 2, the client 205 and service 210 have matching dispatcher hierarchies (each PEP at the client side has a reciprocal PEP at the service side). Thereby, any modifications and/or additions that are made to the message at the client side are reversed or removed at the service side. In alternative embodiments, the dispatcher hierarchy at the service 210 may not match the dispatcher hierarchy at the client 205. This may be the case, for example, if one of the service side or client side dispatcher hierarchies includes a PEP that does not append information to or otherwise modify a message (e.g., a PEP that guarantees QoS).

Figure 3A:
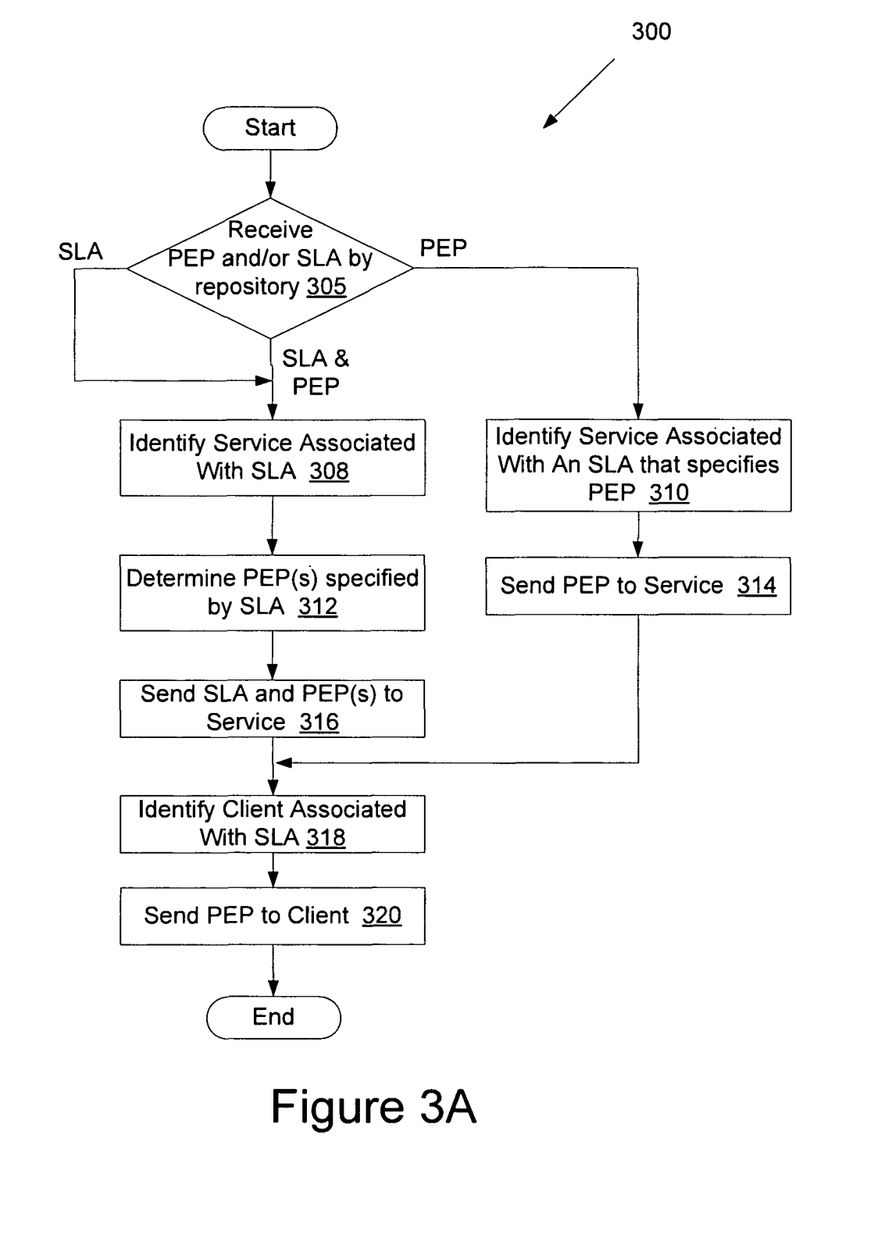
FIG. 3A illustrates a flow diagram of one embodiment for a method of distributing policy enforcement points and/or service level agreements to services in a service oriented architecture.

FIG. 3A illustrates a flow diagram of one embodiment for a method 300 of distributing policy enforcement points and/or service level agreements to services in a service oriented architecture. The method may be performed by processing logic that may comprise hardware (e.g., circuitry, dedicated logic, programmable logic, microcode, etc.), software (such as instructions run on a processing device), or a combination thereof. In one embodiment, method 300 is performed by repository manager 112 of FIG. 1A. The repository manager 112 may be a service of an ESB.

Referring to FIG. 3A, at block 305 a policy management repository receives a policy enforcement point (PEP) and/or a service level agreement (SLA). The policy enforcement point may be an update to an existing policy enforcement point that already resides at the policy management repository, or may be a new policy enforcement point. Similarly, the SLA may be an update to an existing SLA that already resides at the policy management repository, or may be a new SLA. If only a service level agreement is received, or if both a service level agreement and a policy enforcement point are received, the method proceeds to block 308. If only a PEP is received, the method continues to block 310.

At block 308, the repository manager identifies a service that is associated with the received SLA. At block 312, the repository manager determines one or more PEPs that are specified by the SLA. At block 316, the repository manager sends the SLA and the associated PEPs to the identified service. The SLA and PEPs may be sent to the service using a standard communication transport implemented in the ESB. Alternatively, the SLA and/or PEPs may be sent to the service using the Atom Publication Protocol (AtomPub) and/or XMPP. The method continues to block 318. Alternatively, the method may end.

At block 310, the repository manager identifies a service associated with and SLA that specifies the received PEP. At block 314, the repository manager sends the PEP to the identified service. In one embodiment, if the PEP is an update to an active PEP already installed at the service, then the repository manager sends the PEP directly to the active PEP rather than to the service. The method then continues to block 318. Alternatively, the method may end.

At block 318, the repository manager identifies a client that is associated with the received SLA and/or the SLA that specifies the received PEP. At block 320, if a new PEP was received at block 305, the new PEP is sent to a client. The method then ends.

Figure 3B:
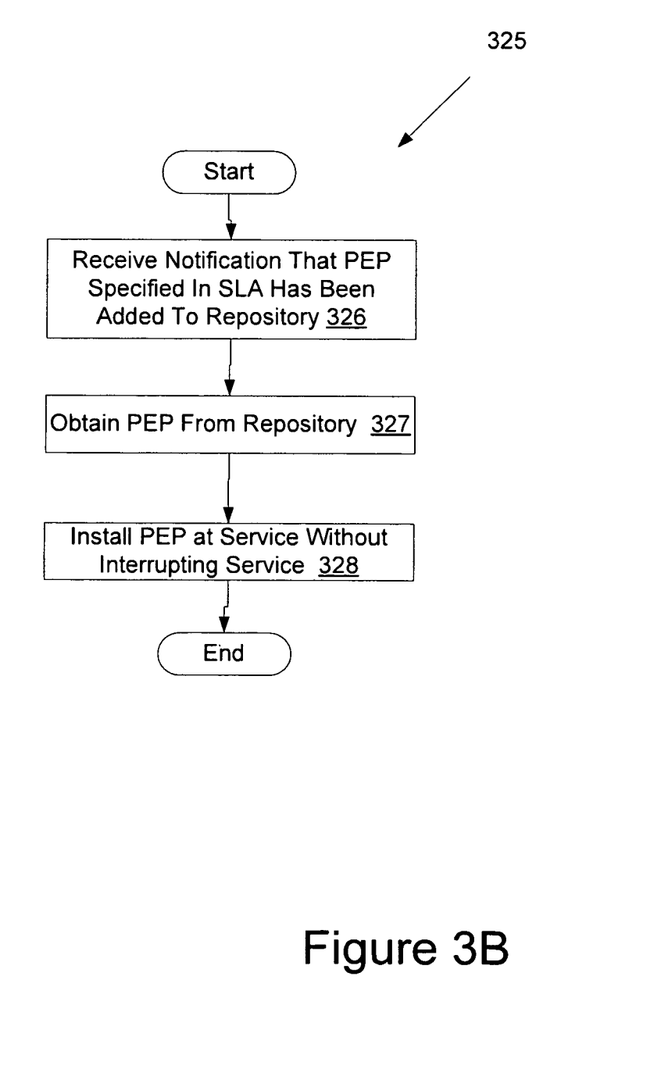
FIG. 3B illustrates a flow diagram of one embodiment for a method of dynamically updating a service level agreement and/or a policy enforcement point at a service.

FIG. 3B illustrates a flow diagram of one embodiment for a method 325 of dynamically updating a policy enforcement point at a service. The method may be performed by processing logic that may comprise hardware (e.g., circuitry, dedicated logic, programmable logic, microcode, etc.), software (such as instructions run on a processing device), or a combination thereof. In one embodiment, method 325 is performed by a service 130 of FIG. 1A. Method 325 may also be performed by a PEP 115 that operates on the service 130 of FIG. 1A.

Referring to FIG. 3B, at block 326 a service receives notification that a policy enforcement point specified in an SLA used by the service has been updated. At block 327, the service obtains the PEP from the repository or from a repository manager. In one embodiment, the PEPs for which modification is indicated contact a repository manager and/or a policy management repository, and receive PEP updates therefrom. In one embodiment, the PEP is received along with the notification at block 326. The method then ends.

At block 328, the service installs the modified PEPs without interrupting the service. Accordingly, the SLA is installed without shutting down the service, without uninstalling the service, without redeploying the service, etc. In one embodiment, the PEPs that are to be modified update themselves by performing the installation. In such an embodiment, the PEPs may update themselves without interrupting the PEP (e.g., without requiring the PEP to be uninstalled and reinstalled).

Figure 3C:
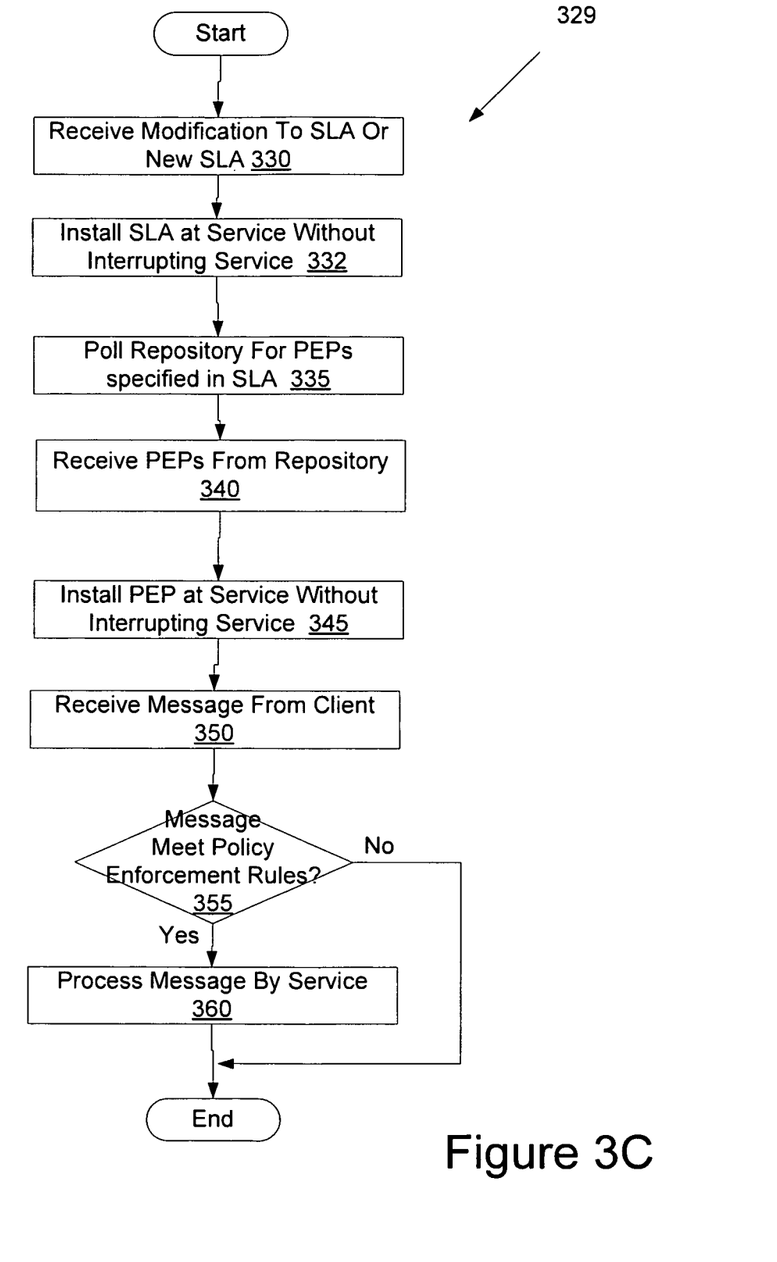
FIG. 3C illustrates a flow diagram of one embodiment for a method of dynamically updating a policy enforcement point at a service.

FIG. 3C illustrates a flow diagram of one embodiment for a method 329 of dynamically updating a service level agreement and/or a policy enforcement point at a service. The method may be performed by processing logic that may comprise hardware (e.g., circuitry, dedicated logic, programmable logic, microcode, etc.), software (such as instructions run on a processing device), or a combination thereof. In one embodiment, method 329 is performed by a service 130 of FIG. 1A. Method 329 may also be performed by a PEP 115 that operates on the service 130 of FIG. 1A.

Referring to FIG. 3C, at block 330 a service receives a new SLA and/or a modification to an existing SLA that is being used by the service. The new SLA and/or modification to the existing SLA may specify new PEPs that the service needs to install, or may specify updates that the service needs to install to existing PEPs. In one embodiment, the new and/or modified SLA are received from a policy management repository and/or a repository manager in response to polling the policy management repository or the repository manager.

At block 332, the service installs the new SLA without interrupting the service. The new and/or modified SLA may replace an existing SLA, or may be installed to be used in parallel with any existing SLAs.

At block 335, the service polls a policy management repository or repository manager to determine if the new PEPs and/or updates to existing PEPs specified in the SLA are stored by the policy management repository. At block 340, the service receives the new and/or modified PEPs from the policy management repository and/or the repository manager. In one embodiment, new PEPs are addressed to the service, and modified PEPs are addressed to the existing PEPs that they will modify. At block 350, the PEPs are installed at the service without interrupting the service and/or without interrupting any PEPs operating at the service. New PEPs may be installed by the service. Modifications to existing PEPs may be installed individually by the PEPs that are to be modified and/or by the service. In one embodiment, block 330 and block 340 are combined such that PEPs and SLAs are received together. Likewise, block 335 and block 345 may be combined such that installation of the SLA and of the PEPs happens in a single action.

At block 350, the service receives a message from the client. At block 355, one or more of the PEPs installed at the service process the received message to determine if it satisfies policy enforcement rules. If the message satisfies all policy enforcement rules, the message is processed by the service at block 360. Otherwise, the message is not processed by the service. The method then ends.

Figure 4:
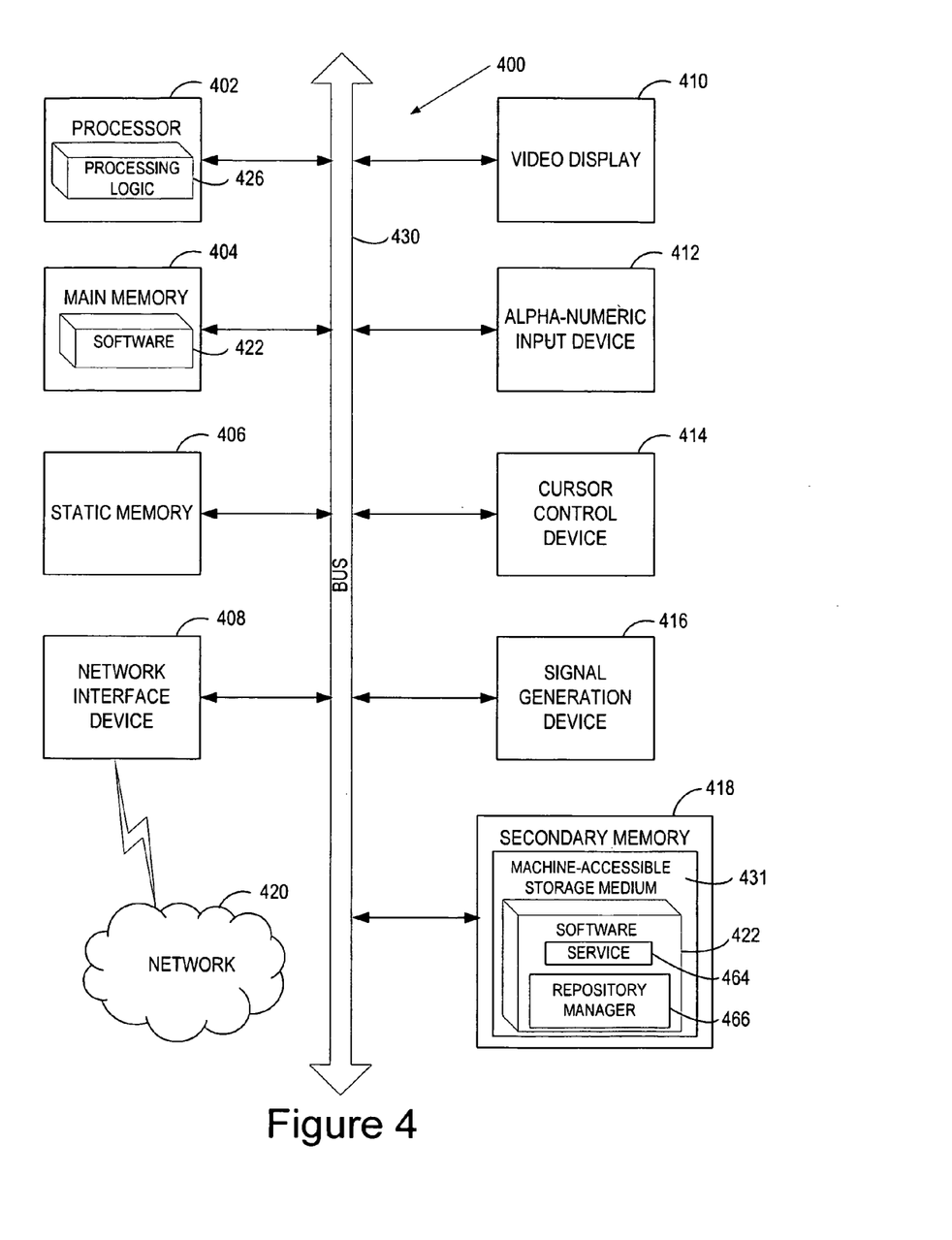
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

The machine-readable storage medium 431 may also be used to store a service 464 (e.g., a service 130 of FIG. 1A) or a policy management repository 466 (e.g., policy management repository 110 of FIG. 1A), and/or a software library containing methods that call the service 464 or policy management repository 466. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    in response to a policy enforcement point being added to a repository that is a component of a service oriented architecture, performing the following by a processor executing a repository manager:
        identifying, without user input, an active service associated with a service level agreement that specifies the policy enforcement point, wherein the policy enforcement point is to be implemented as a dispatcher;
        propagating the policy enforcement point to the active service, wherein the policy enforcement point is installed on a machine executing the active service without interrupting the active service by adding the policy enforcement point to an existing dispatcher chain associated with the active service at a particular position within the existing dispatcher chain, wherein the existing dispatcher chain comprises at least one existing dispatcher, and wherein the policy enforcement point is collocated with the active service on the machine and occupies an address space of the active service;
        receiving the service level agreement by the repository, wherein the service level agreement specifies the policy enforcement point in an enforcement policy;
        propagating the service level agreement to the active service, wherein the service level agreement is installed at the active service without interrupting the active service; and
        propagating the policy enforcement point to a client that is associated with the service level agreement installed at the active service.

2. The method of claim 1, further comprising:
    identifying the client that is associated with the service level agreement.

3. The method of claim 1, wherein the active service is registered to receive policy enforcement points specified in the service level agreement from the repository.

4. The method of claim 1, wherein the machine on which the policy enforcement point is collocated with the active service is a virtual machine.

5. The method of claim 1, wherein the at least one existing dispatcher comprises an existing policy enforcement point that is associated with the service level agreement, the method further comprising:
    responsive to a query, determining that an update for the existing policy enforcement point has been added to the repository; and
    sending the update for the existing policy enforcement point to an address of the existing policy enforcement point rather than to an address of the active service, wherein the update for the existing policy enforcement point is installed without interrupting the active service.

6. A non-transitory computer readable storage medium including instructions that, when executed by a processor executing a repository manager, cause the processor to:
    in response to a policy enforcement point being added to a repository that is a component of a service oriented architecture, cause the processor executing the repository manager to:
        identify, without user input, an active service associated with a service level agreement that specifies the policy enforcement point, wherein the policy enforcement point is to be implemented as a dispatcher;
        propagate the policy enforcement point to the active service, wherein the policy enforcement point is installed on a machine executing the active service without interrupting the active service by adding the policy enforcement point to an existing dispatcher chain associated with the active service at a particular position within the existing dispatcher chain, wherein the existing dispatcher chain comprises at least one existing dispatcher, and wherein the policy enforcement point is collocated with the active service on the machine and occupies an address space of the active service;
        receive the service level agreement by the repository, wherein the service level agreement specifies the policy enforcement point in an enforcement policy;
        propagate the service level agreement to the active service, wherein the service level agreement is installed at the active service without interrupting the active service; and
        propagate the policy enforcement point to a client that is associated with the service level agreement installed at the active service.

7. The non-transitory computer readable storage medium of claim 6, wherein the processor is further to:
    identify the client that is associated with the service level agreement.

8. The non-transitory computer readable storage medium of claim 6, wherein the active service is registered to receive policy enforcement points specified in the service level agreement from the repository.

9. A computing system comprising:
    a data store to receive and store a policy enforcement point; and
    a server computing device that comprises a memory to store instructions for a repository manager, and a processor to execute the instructions to:
        in response to the policy enforcement point being added to a repository that is a component of a service oriented architecture:
            identify, without user input, an active service associated with a service level agreement that specifies the policy enforcement point, wherein the policy enforcement point is to be implemented as a dispatcher;
            propagate the policy enforcement point to the active service, wherein the policy enforcement point is installed on a machine executing the active service without interrupting the active service by adding the policy enforcement point to an existing dispatcher chain associated with the active service at a particular position within the existing dispatcher chain, wherein the existing dispatcher chain comprises at least one existing dispatcher, and wherein the policy enforcement point is collocated with the active service on the machine and occupies an address space of the active service;
            receive the service level agreement by the repository, wherein the service level agreement specifies the policy enforcement point in an enforcement policy;

propagate the service level agreement to the active service, wherein the service level agreement is installed at the active service without interrupting the active service; and propagate the policy enforcement point to a client that is associated with the service level agreement installed at the active service.

10. The computing system of claim 9, wherein the processor is further to execute the instructions to:

identify a client that is associated with the service level agreement.

11. The computing system of claim 9, wherein the active service is registered to receive policy enforcement points specified in the service level agreement from the repository.

12. The computing system of claim 9, further comprising:

an additional computing device, networked to the server computing device, that hosts the active service, wherein the additional computing device is to receive the policy enforcement point from the server computing device and to install the policy enforcement point without interrupting the active service.

13. The computing system of claim 12, wherein the additional computing device is to poll the server computing device to determine whether a new policy enforcement point or an update to an existing policy enforcement point specified in the service level agreement has been added to the data store.

* * * * *